United States Patent
Sakuma

(10) Patent No.: US 10,450,925 B2
(45) Date of Patent: Oct. 22, 2019

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventor: Tetsuya Sakuma, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/928,646

(22) Filed: Mar. 22, 2018

(65) Prior Publication Data
US 2018/0274419 A1 Sep. 27, 2018

(30) Foreign Application Priority Data
Mar. 22, 2017 (JP) .................................. 2017-055908

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9409* (2013.01); *B01D 53/9418* (2013.01); *B01D 53/9431* (2013.01); *B01D 53/9495* (2013.01); *F01N 3/0814* (2013.01); *F01N 3/0842* (2013.01); *F01N 3/0885* (2013.01); *F01N 3/2013* (2013.01); *F01N 3/2026* (2013.01); *F01N 3/2066* (2013.01); *F01N 11/002* (2013.01); *F01N 13/009* (2014.06); *B01D 2251/2067* (2013.01); *B01D 2255/91* (2013.01); *F01N 2430/06* (2013.01); *F01N 2560/021* (2013.01); *F01N 2560/026* (2013.01); *F01N 2560/06* (2013.01); *F01N 2560/14* (2013.01); *F01N 2610/02* (2013.01); *F01N 2610/146* (2013.01); *F01N 2610/1453* (2013.01); *F01N 2900/08* (2013.01); *F01N 2900/1602* (2013.01);
(Continued)

(58) Field of Classification Search
None
See application file for complete search history.

(56) References Cited

U.S. PATENT DOCUMENTS

2013/0052107 A1* 2/2013 Fukuda .................. B01D 53/90
423/212

FOREIGN PATENT DOCUMENTS

| JP | 2012-17687 | 1/2012 |
|---|---|---|
| JP | 2016-37903 | 3/2016 |

* cited by examiner

*Primary Examiner* — Jelitza M Perez
(74) *Attorney, Agent, or Firm* — Finnegan, Henderson, Farabow, Garrett & Dunner, LLP

(57) ABSTRACT

In cases where an adsorption amount of ammonia in the SCR catalyst is smaller than a predetermined target adsorption amount, when a condition of $NO_X$ being assumed not to flow into the SCR catalyst is satisfied, and when the temperature of the SCR catalyst falls within a temperature range (effective range) which is equal to or higher than a desorption temperature of ammonia adsorbed to the weak adsorption sites and which is less than a desorption temperature of ammonia adsorbed to the active sites, the adsorption of ammonia to the active sites is carried out, while suppressing the adsorption of ammonia to the weak adsorption sites, by supplying the additive agent to the SCR catalyst from a supply device.

11 Claims, 6 Drawing Sheets

(51) Int. Cl.
   *F01N 13/00*   (2010.01)
   *F01N 3/08*    (2006.01)
   *F01N 11/00*   (2006.01)
(52) U.S. Cl.
   CPC ................. *F01N 2900/1614* (2013.01); *F01N 2900/1622* (2013.01); *Y02T 10/24* (2013.01); *Y02T 10/47* (2013.01)

EXHAUST GAS PURIFICATION APPARATUS FOR AN INTERNAL COMBUSTION ENGINE

BACKGROUND

Technical Field

The present disclosure relates to an exhaust gas purification apparatus for an internal combustion engine, and in particular to such an exhaust gas purification apparatus provided with a selective catalytic reduction (SCR) catalyst.

Background Art

As an exhaust gas purification apparatus for an internal combustion engine which is operated in a lean-burn state, there is known a technology that includes an SCR catalyst arranged in an exhaust passage, and a supply device for supplying an additive agent, which is a reducing agent or a precursor of a reducing agent, to the SCR catalyst, wherein an amount of the additive agent to be supplied to the SCR catalyst from the supply device is controlled in such a manner that an amount of the reducing agent having been adsorbed to the SCR catalyst (an adsorption amount of the reducing agent) becomes a predetermined target adsorption amount (see, for example, patent literature 1). In addition, in patent literature 2, there is disclosed a technology in which during fuel cut operation, in cases where it is determined that a deposit is in a state being produced, injection of an aqueous urea solution is stopped, whereas in cases where it is determined that there is produced no deposit, the injection of the aqueous urea solution is carried out.

PATENT LITERATURE

Patent Literature 1: Japanese patent application laid-open publication No. 2012-17687
Patent Literature 2: Japanese patent application laid-open publication No. 2016-37903

SUMMARY

However, the reducing agent having flowed into the SCR catalyst may adsorb to adsorption points or sites other than transition metal ions (hereinafter, being referred to as "active sites"), such as copper ions, iron ions, etc., which are supported by a catalyst carrier. As one of the adsorption sites other than the active sites, there is, for example, a lattice defect in the catalyst carrier (e.g., a silanol group in zeolite), a surface layer of the reducing agent having already adsorbed to the active sites, or the like (hereinafter, these adsorption sites being referred to as "weak adsorption sites"). The reducing agent adsorbed to the weak adsorption sites desorbs at a temperature lower than that at which the reducing agent adsorbed to the active sites does. However, when the additive agent is supplied to the SCR catalyst from the supply device at the time when the temperature of the SCR catalyst is lower than a desorption temperature of the reducing agent adsorbed to the weak adsorption sites, the ratio of the reducing agent having adsorbed to the weak adsorption sites among the reducing agent having been adsorbed to the SCR catalyst may become large.

Here, note that the reducing agent adsorbed to the active sites of the SCR catalyst contributes to the reduction of $NO_X$, but the reducing agent adsorbed to the weak adsorption sites hardly contributes to the reduction of $NO_X$. For that reason, when the ratio of the reducing agent having adsorbed to the weak adsorption sites among the reducing agent having been adsorbed to the SCR catalyst becomes large, the $NO_X$ reduction rate of the SCR catalyst (i.e., the ratio of the amount of $NO_X$ to be reduced in the SCR catalyst with respect to the amount of $NO_X$ flowing into the SCR catalyst) may become small.

The present disclosure has been made in view of the above-mentioned actual circumstances, and the object of the present disclosure is to suppress a decrease of an $NO_X$ reduction rate in a selective catalytic reduction (SCR) catalyst, by increasing an amount of a reducing agent adsorbing to active sites as much as possible, while suppressing an amount of a reducing agent adsorbing to weak adsorption sites as small as possible.

According to the present disclosure, in order to solve the above-mentioned problems, in cases where an adsorption amount of a reducing agent in an SCR catalyst is smaller than a predetermined target adsorption amount, when a condition of $NO_X$ being assumed not to flow into the SCR catalyst is satisfied, and when the temperature of the SCR catalyst falls within a temperature range (effective range) which is equal to or higher than a desorption temperature of the reducing agent adsorbed to weak adsorption sites and which is less than a desorption temperature of the reducing agent adsorbed to active sites, the adsorption of the reducing agent to the active sites is carried out, while suppressing the adsorption of the reducing agent to the weak adsorption sites, by supplying the additive agent to the SCR catalyst from a supply device.

Specifically, the present disclosure resides in an exhaust gas purification apparatus for an internal combustion engine which comprises: an SCR catalyst that is arranged in an exhaust passage of the internal combustion engine, and reduces $NO_X$ in an exhaust gas by using a reducing agent; a supply device that is arranged in the exhaust passage at the upstream side of the SCR catalyst, and supplies an additive agent, which is the reducing agent or a precursor of the reducing agent, to the SCR catalyst; and a controller comprising at least one processor. The controller configured to: detect a temperature of the SCR catalyst; and control the supply device in such a manner that an adsorption amount of the reducing agent, which is an amount of the reducing agent having been adsorbed to the SCR catalyst, becomes a predetermined target adsorption amount. Then, the controller controls the supply device so that in cases where the adsorption amount of the reducing agent in the SCR catalyst is smaller than the predetermined target adsorption amount, when the detected temperature of the SCR catalyst falls within an effective range which is a temperature range which is equal to or higher than a desorption temperature of the reducing agent adsorbed to weak adsorption sites of the SCR catalyst and which is less than a desorption temperature of the reducing agent adsorbed to active sites of the SCR catalyst, the additive agent is supplied to the SCR catalyst. The active sites referred to herein are transition metal ions (e.g., iron ions, copper ions, etc.) which are supported by a catalyst carrier, as mentioned above. In addition, the weak adsorption sites are a lattice defect in the catalyst carrier (e.g., a silanol group in zeolite, etc.), a surface layer of the reducing agent having already adsorbed to the active sites, or the like, as mentioned above.

According to the exhaust gas purification apparatus for an internal combustion engine according to the present disclosure, in cases where the adsorption amount of the reducing agent in the SCR catalyst is smaller than the predetermined target adsorption amount, when the temperature of the SCR catalyst falls within the effective range which is a temperature range where the reducing agent hardly adsorbs to the weak adsorption sites and the reducing agent easily adsorbs to the active sites, the additive agent will be supplied to the SCR catalyst from the supply device. For that reason, an amount of the reducing agent adsorbing to the active sites can be increased as much as possible, while suppressing an amount of the reducing agent adsorbing to the weak adsorption sites as small as possible.

In the exhaust gas purification apparatus for an internal combustion engine according to the present disclosure, the supply of the additive agent by the supply device as mentioned above may be carried out under the condition that it is assumed that $NO_X$ does not flow into the SCR catalyst. Here, when the additive agent is made to be supplied from the supply device to the SCR catalyst under the condition that $NO_X$ flows into the SCR catalyst, at least a part of the additive agent supplied from the supply device will be consumed in order to reduce the $NO_X$ in the exhaust gas. In such a situation, in order to increase the amount of reducing agent to be adsorbed to the active sites, it is necessary to make the amount of additive agent to be supplied from the supply device per unit time larger than the amount of additive agent to be consumed for the reduction of $NO_X$ per unit time. As a result, the amount of additive agent to be supplied from the supply device per unit time may become larger, and accordingly, an amount of reducing agent passing through the SCR catalyst (i.e., a slip amount of reducing agent) may also become larger. On the other hand, under the condition that $NO_X$ is assumed not to flow into the SCR catalyst, it is not necessary to add the amount of additive agent to be consumed for the reduction of $NO_X$ to the amount of the additive agent to be supplied from the supply device per unit time. For that reason, the amount of additive agent to be supplied from the supply device per unit time can be suppressed to be small. As a result, it becomes possible to increase the amount of reducing agent to be adsorbed to the active sites, while suppressing an increase in the slip amount of reducing agent.

However, in cases where the adsorption amount of the reducing agent in the SCR catalyst is smaller than the predetermined target adsorption amount, when a state where the temperature of the SCR catalyst is lower than the effective range continues, there may continue a state in which the reducing agent having adsorbed to the active sites of the SCR catalyst is consumed for the reduction of $NO_X$, without the additive agent being supplied to the SCR catalyst from the supply device. In that case, the amount of the reducing agent having adsorbed to the active sites of the SCR catalyst may become excessively smaller, so that the amount of $NO_X$ unable to be reduced in the SCR catalyst may increase.

Accordingly, the exhaust gas purification apparatus for an internal combustion engine according to the present disclosure may further comprise: a heating device configured to heat the SCR catalyst. And, the controller may be further configured to control the heating device in order to raise the temperature of the SCR catalyst to a temperature within the effective range, when the detected temperature of the SCR catalyst is lower than the effective range at the time when the adsorption amount of the reducing agent in the SCR catalyst is smaller than the predetermined target adsorption amount.

According to such a construction, it is possible to suppress the state where the temperature of the SCR catalyst is lower than the effective range continues, when the adsorption amount of the reducing agent in the SCR catalyst is smaller than the predetermined target adsorption amount. As a result, it is possible to suppress the continuation of the state where the reducing agent adsorbed to the active sites of the SCR catalyst is consumed for the reduction of $NO_X$, without the reducing agent being supplied to the SCR catalyst from the supply device. This serves to suppress the amount of the reducing agent adsorbed to the active sites of the SCR catalyst from becoming excessively smaller.

Here, as the condition or case where it is assumed that $NO_X$ does not flow into the SCR catalyst, there can be considered a case where a gas containing no $NO_X$ flows through the SCR catalyst. The "gas containing no $NO_X$" referred to herein may be not only a gas which does not contain $NO_X$ at all, but also a gas which contains a very little amount of $NO_X$ (e.g., an upper limit value of the amount of $NO_X$ with which the amount of reducing agent to be adsorbed to the active sites is considered to be able to be increased in an efficient manner even if such a very little amount of $NO_X$ is reduced in the SCR catalyst, and which is hereinafter referred to as an "allowable amount of $NO_X$"). As the condition or case where such a gas flows through the SCR catalyst, there can be considered the following cases. That is, case (1) is that during the operation of the internal combustion engine, the $NO_X$ in the exhaust gas is removed at the upstream side of the SCR catalyst; case (2) is that fuel cut processing of the internal combustion engine is carried out; and case (3) is that the air fuel ratio of a mixture used for combustion in the internal combustion engine is a rich air fuel ratio. Here, note that, as case (1) above where during the operation of the internal combustion engine, $NO_X$ is removed at the upstream side of the SCR catalyst, there can be considered, for example, a case in which in a construction where an NSR catalyst is arranged in the exhaust passage at the upstream side of the SCR catalyst, the air fuel ratio of the exhaust gas flowing into the NSR catalyst is a lean air fuel ratio which is higher than a stoichiometric air fuel ratio. The NSR catalyst referred to herein is an $NO_X$ storage reduction catalyst which acts to store $NO_X$ in the exhaust gas when the air fuel ratio of the exhaust gas is a lean air fuel ratio, but to release and reduce the $NO_X$ thus stored when the air fuel ratio of the exhaust gas is a rich air fuel ratio lower than the stoichiometric air fuel ratio. Here, note that when the storage amount of $NO_X$ in the NSR catalyst becomes relatively large, even if the air fuel ratio of the exhaust gas flowing into the NSR catalyst is a lean air fuel ratio, it will become easy for a part of the $NO_X$ having flowed into the NSR catalyst to pass through the NSR catalyst. Accordingly, in cases where the air fuel ratio of the exhaust gas flowing into the NSR catalyst is a lean air fuel ratio, and in cases where the storage amount of $NO_X$ in the NSR catalyst is equal to or less than a predetermined upper limit value, a determination need only be made that $NO_X$ is removed at the upstream side of the SCR catalyst. The "predetermined upper limit value" referred to herein is a value at which it is assumed that when the storage amount of $NO_X$ in the NSR catalyst exceeds the predetermined upper limit value, an amount of $NO_X$ larger than the allowable amount of $NO_X$ can pass through the NSR catalyst.

In addition, as the condition or case where it is assumed that $NO_X$ does not flow into the SCR catalyst, there can also be considered a case where the internal combustion engine is in an operation stop state. Accordingly, when the adsorption amount of the reducing agent in the SCR catalyst is smaller than the predetermined target adsorption amount, and when the temperature of the SCR catalyst falls within the effective range, at a point in time at which the operation of the internal combustion engine is stopped, the additive agent may be supplied to the SCR catalyst from the supply device. According to such a construction, the $NO_X$ reduction rate of the SCR catalyst immediately after the internal combustion engine has been restarted can be enhanced. Moreover, in cases where the exhaust gas purification device is provided with a heating device, when the temperature of the SCR catalyst at the point in time at which the operation of the internal combustion engine has been stopped is lower than the effective range, the additive agent need only be supplied to the SCR catalyst from the supply device after the SCR catalyst has been heated by the heating device.

According to the present disclosure, an amount of a reducing agent adsorbing to active sites of an SCR catalyst can be increased as much as possible, while suppressing an amount of the reducing agent adsorbing to weak adsorption sites of the SCR catalyst as small as possible, so that the $NO_X$ reduction rate of the SCR catalyst can be made as high as possible.

DESCRIPTION OF EMBODIMENTS

Hereinafter, specific modes or embodiments of the present disclosure will be described based on the attached drawings. However, the dimensions, materials, shapes, relative arrangements and so on of component parts described in the embodiments are not intended to limit the technical scope of the present disclosure to these alone in particular as long as there are no specific statements.

First Embodiment

Figure 1:
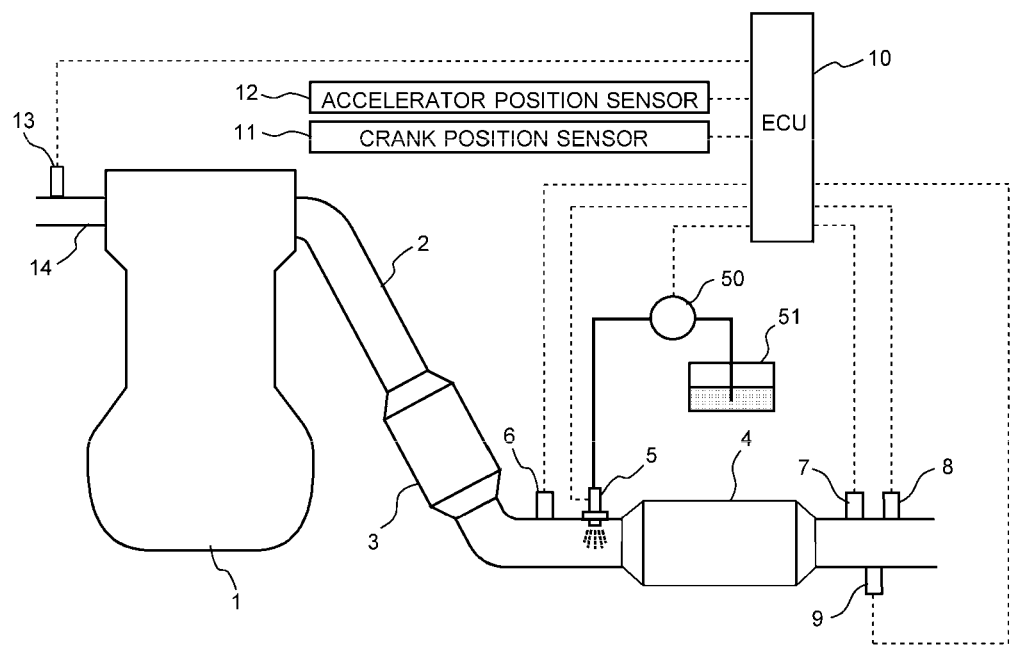
FIG. 1 is a view showing the schematic construction of an internal combustion engine and its intake and exhaust systems to which the present disclosure is applied, in a first embodiment of the present disclosure.

First, reference will be made to a first embodiment of the present disclosure based on FIGS. 1 through 3. FIG. 1 is a view showing the schematic construction of an internal combustion engine and its intake and exhaust systems, to which an exhaust gas purification apparatus according to the present disclosure is applied. The internal combustion engine 1 shown in FIG. 1 is an internal combustion engine of compression ignition type (diesel engine) using light oil as fuel. Here, note that the internal combustion engine 1 may be a spark ignition type internal combustion engine (gasoline engine) in which a lean burn operation is able to be carried out.

An exhaust passage 2, through which burnt gas (exhaust gas) discharged from engine cylinders passes, is connected to the internal combustion engine 1. A first catalyst casing 3 is arranged in the middle of the exhaust passage 2. A second catalyst casing 4 is arranged in the exhaust passage 2 at the downstream side of the first catalyst casing 3.

The first catalyst casing 3 has a catalyst carrier carrying an NSR catalyst and a particulate filter received in a cylindrical casing. The NSR catalyst referred to herein is an $NO_X$ storage reduction catalyst which acts to store $NO_X$ in the exhaust gas when the air fuel ratio of the exhaust gas is a lean air fuel ratio, but to release and reduce the $NO_X$ thus stored by making it react with reducing components (HC, CO, etc.) in the exhaust gas into $N_2$ when the fuel ratio of the exhaust gas is a rich air fuel ratio lower than the stoichiometric air fuel ratio. The particulate filter traps the PM (Particulate Matter) contained in the exhaust gas.

The second catalyst casing 4 receives therein a catalyst carrier by which a selective catalytic reduction (SCR) catalyst is supported in a cylindrical casing. The catalyst carrier is formed by coating the catalyst carrier of a zeolite-based material on a monolith type substrate having a honeycomb shaped cross section, for example. Then, Cu, Fe, etc., which are transition metal elements, are ion exchanged and supported on the catalyst carrier. The SCR catalyst constructed in this manner serves to adsorb a reducing agent contained in the exhaust gas, and to reduce $NO_X$ in the exhaust gas into $N_2$ by using the reducing agent thus adsorbed.

An addition valve 5 for adding (injecting) an additive agent, which is the reducing agent or a precursor of the reducing agent, into the exhaust gas is arranged in the exhaust passage 2 at a location between the first catalyst casing 3 and the second catalyst casing 4. The addition valve 5 is connected to an additive agent tank 51 through a pump 50. The pump 50 draws the additive agent stored in the additive agent tank 51, and at the same time, pressure feeds the additive agent thus drawn to the addition valve 5. The addition valve 5 injects the additive agent pressure fed from the pump 50 into the exhaust passage 2. A combination of the addition valve 5, the pump 50 and the additive agent tank 51 as mentioned above corresponds to a "supply device" according to the present disclosure.

Here, note that, as the additive agent stored in the additive agent tank 51, there can be used an $NH_3$ gas or an aqueous solution of urea, ammonium carbamate or the like, but the aqueous urea solution is used in this embodiment. When the aqueous urea solution is injected from the addition valve 5, the aqueous urea solution flows into the second catalyst casing 4 together with the exhaust gas. At that time, the aqueous urea solution is thermally decomposed by receiving the heat of the exhaust gas, or is hydrolyzed by the SCR catalyst. When the aqueous urea solution is thermally decomposed or hydrolyzed, ammonia ($NH_3$) is produced. The ammonia generated in this manner is adsorbed to the SCR catalyst. The SCR catalyst reduces the $NO_X$ contained in the exhaust gas to $N_2$ by using the ammonia adsorbed to the SCR catalyst as the reducing agent.

An ECU 10 is provided in combination with the internal combustion engine 1 as constructed in this manner. The ECU 10 is an electronic control unit which is provided with a CPU, a ROM, a RAM, a backup RAM, and so on. To the ECU 10, there are electrically connected a variety of kinds of sensors such as a first $NO_X$ sensor 6, a second $NO_X$ sensor 7, an exhaust gas temperature sensor 8, an ammonia ($NH_3$)

sensor 9, a crank position sensor 11, an accelerator position sensor 12, an air flow meter 13, and so on.

The first $NO_X$ sensor 6 is arranged in the exhaust passage 2 at a location between the first catalyst casing 3 and the second catalyst casing 4, and outputs an electric signal correlated with the concentration of $NO_X$ in the exhaust gas flowing into the second catalyst casing 4. The second $NO_X$ sensor 7 is arranged in the exhaust passage 2 at a location downstream of the second catalyst casing 4, and outputs an electric signal correlated with the concentration of $NO_X$ in the exhaust gas flowing out from the second catalyst casing 4. The exhaust gas temperature sensor 8 is arranged in the exhaust passage 2 at a location downstream of the second catalyst casing 4, and outputs an electric signal correlated with the temperature of the exhaust gas flowing out from the second catalyst casing 4. The ammonia sensor 9 is arranged in the exhaust passage 2 at a location downstream of the second catalyst casing 4, and outputs an electric signal correlated with the concentration of ammonia in the exhaust gas flowing out from the second catalyst casing 4.

The crank position sensor 11 outputs an electric signal correlated with the rotational position of an output shaft (crankshaft) of the internal combustion engine 1. The accelerator position sensor 12 outputs an electric signal correlated with the amount of operation of an accelerator pedal (i.e., the degree of opening of an accelerator). The air flow meter 13 outputs an electric signal correlated with the amount (i.e., the mass) of air sucked into the internal combustion engine 1.

In addition, the ECU 10 is electrically connected to the above-mentioned addition valve 5, the pump 50 and so on, in addition to various kinds of equipment (e.g., fuel injection valves, etc.) mounted on the internal combustion engine 1. The ECU 10 controls a variety of kinds of equipment of the internal combustion engine 1, the addition valve 5, the pump 50 and so on in an electrical manner based on the output signals of the above-mentioned variety of kinds of sensors. For example, in addition to known control such as fuel injection control in which the amount and timing of fuel injection of each fuel injection valve are controlled according to the engine load and the engine rotational speed of the internal combustion engine 1, the ECU 10 carries out addition processing which is processing in which the aqueous urea solution is added from the addition valve 5 so that the adsorption amount of ammonia in the SCR catalyst becomes the predetermined target amount of adsorption. In the following, reference will be made to a method of carrying out the addition processing in this embodiment.

As mentioned above, the SCR catalyst adsorbs the ammonia produced by thermal decomposition and hydrolysis of the aqueous urea solution added from the addition valve 5, and reduces the $NO_X$ in the exhaust gas to $N_2$ by using the ammonia thus adsorbed as the reducing agent. In that case, the adsorption mode of ammonia in the SCR catalyst may not be uniform, and may adsorb to adsorption sites other than the above-mentioned transition metal ions (active sites). As one of the adsorption sites other than the active sites, there is a weak adsorption site such as a lattice defect (silanol group) included in zeolite as the catalyst carrier, or a surface layer of the ammonia which has already adsorbed to the active sites.

Here, the ammonia adsorbed to the active sites contributes to the reduction of $NO_X$, but the ammonia adsorbed to the weak adsorption sites does not contribute to the reduction of $NO_X$. For that reason, when the percentage ratio of the amount of ammonia having adsorbed to the weak adsorption sites among the ammonia having adsorbed to the SCR catalyst becomes large, the $NO_X$ reduction rate of the SCR catalyst may become smaller than a desired $NO_X$ reduction rate.

Accordingly, in the addition processing of this embodiment, an addition condition for the aqueous urea solution is decided, by focusing on a characteristic in which the desorption temperature of the ammonia adsorbed to the weak adsorption sites is lower than the desorption temperature of the ammonia adsorbed to the active sites. Specifically, in the addition processing of this embodiment, in cases where the adsorption amount of ammonia in the SCR catalyst is smaller than the predetermined target amount of adsorption, the addition of the aqueous urea solution by the addition valve 5 is carried out when the temperature of the SCR catalyst falls within an effective range. The effective range referred to herein is a temperature range in which ammonia can hardly adsorb to the weak adsorption sites, but can easily adsorb to the active sites. Here, the effective range will be explained based on FIG. 2. FIG. 2 is a view showing the correlation between the temperature of the SCR catalyst (Tscr) and the adsorption rate of ammonia at each adsorption site. A solid line in FIG. 2 indicates the adsorption rate of ammonia at the active sites, and an alternate long and short dash line in FIG. 2 indicates the adsorption rate of ammonia at the weak adsorption sites. In FIG. 2, when the temperature of the SCR catalyst Tscr rises to a first temperature T1, the ammonia having adsorbed to the weak adsorption sites begins to desorb, but on the other hand, the ammonia having adsorbed to the active sites hardly desorbs. For that reason, when the temperature of the SCR catalyst Tscr rises to the first temperature T1, the adsorption rate of ammonia at the weak adsorption sites begins to decrease, but on the other hand, the adsorption rate of ammonia at the active sites maintains substantially 100%. In addition, when the temperature of the SCR catalyst Tscr rises to a second temperature T2 which is higher than the first temperature T1, ammonia can hardly be adsorbed to the weak adsorption sites, and hence, the adsorption rate of ammonia at the weak adsorption sites becomes substantially 0%. In that case, the ammonia having adsorbed to the active sites hardly desorbs, so the adsorption rate of ammonia at the active sites maintains substantially 100%. Then, when the temperature of the SCR catalyst Tscr rises to a third temperature T3 which is higher than the second temperature T2, the ammonia adsorbed to the active sites begins to desorb, and hence, the adsorption rate of ammonia at the active sites begins to decrease. According to such characteristics, it can be the that a temperature range in which the temperature of the SCR catalyst Tscr is equal to or higher than the first temperature T1 and is less than the third temperature T3 is a temperature range in which ammonia can hardly adsorb to the weak adsorption sites, but ammonia can easily adsorb to the active sites. Accordingly, in this embodiment, the addition processing is carried out by setting, as the effective range, the temperature range which is equal to or higher than the first temperature T1 and is less than the third temperature T3. According to such a method, ammonia can be made to adsorb to the active sites, while suppressing the adsorption of ammonia to the weak adsorption sites.

Here, note that when the addition of the aqueous urea solution according to the above-mentioned method is carried out under the condition that $NO_X$ flows into the SCR catalyst, at least a part of the ammonia supplied to the SCR catalyst will be consumed for reducing the $NO_X$ in the exhaust gas. For that reason, from a point of view of increasing the amount of ammonia to be adsorbed to the active sites, it is necessary to make the amount of the urea water solution to be added from the addition valve 5 per unit time larger than the amount of ammonia to be consumed for the reduction of $NO_X$ per unit time. When the amount of $NO_X$ flowing into the SCR catalyst per unit time increases, it is also necessary to accordingly increase the amount of the urea water solution to be added from the addition valve 5 per unit time. When the amount of the urea water solution to be added from the addition valve 5 per unit time increases, the amount of ammonia to be supplied to the SCR catalyst per unit time also increases accordingly, so the amount of ammonia passing through the SCR catalyst (the amount of ammonia slip) may increase. Accordingly, in the addition processing of this embodiment, when a further condition that $NO_X$ is assumed not to flow into the SCR catalyst is satisfied, in addition to the conditions that the adsorption amount of ammonia in the SCR catalyst is smaller than the predetermined target adsorption amount and that the temperature of the SCR catalyst Tscr falls within the effective range, the addition of the aqueous urea solution by the addition valve 5 is carried out. When the addition of the aqueous urea solution by the addition valve 5 is carried out at the time when the above-mentioned three conditions are satisfied, the amount of ammonia adsorbing to the active sites can be increased in an efficient manner, while suppressing the amount of ammonia slip to be small.

Here, as the condition or case where it is assumed that $NO_X$ does not flow into the SCR catalyst, there can be considered a case where a gas containing no $NO_X$ flows into the SCR catalyst during the operation of the internal combustion engine 1. Here, note that the "gas containing no $NO_X$" referred to herein may be not only a gas which does not contain $NO_X$ at all, but also a gas which contains an allowable amount of $NO_X$ (e.g., an upper limit value of the amount of $NO_X$ with which the amount of ammonia to be adsorbed to the active sites is considered to be able to be increased in an efficient manner even if the allowable amount of $NO_X$ is reduced in the SCR catalyst). As the condition or case where such a gas flows into the SCR catalyst, there can be considered the following cases. That is, almost all of the $NO_X$ discharged from the internal combustion engine 1 during the operation of the internal combustion engine 1 is stored by the NSR catalyst in the first catalyst casing 3; the air fuel ratio of a mixture, which is used for combustion by the internal combustion engine 1 during the operation of the internal combustion engine 1 is a rich air fuel ratio; and fuel cut processing is carried out during the operation of the internal combustion engine 1. As the case above where almost all of the $NO_X$ discharged from the internal combustion engine 1 is stored by the NSR catalyst, there can be considered a case where the air fuel ratio of the exhaust gas flowing into the NSR catalyst is a lean air fuel ratio. However, even if the air fuel ratio of the exhaust gas flowing into the NSR catalyst is a lean air fuel ratio, when the storage amount of $NO_X$ in the NSR catalyst in that case is relatively large, it will become easy for a part of the $NO_X$ having flowed into the NSR catalyst to pass through the NSR catalyst. Accordingly, in this embodiment, when the storage amount of $NO_X$ in the NSR catalyst is equal to or less than a predetermined upper limit value, and when the air fuel ratio of the exhaust gas flowing into the NSR catalyst is a lean air fuel ratio, a determination is made that a gas containing no $NO_X$ flows into the SCR catalyst. The "predetermined upper limit value" referred to herein is a value at which it is assumed that when the storage amount of $NO_X$ in the NSR catalyst exceeds the predetermined upper limit value, an amount of $NO_X$ larger than the above-mentioned allowable amount of $NO_X$ can pass through the NSR catalyst. Such a predetermined upper limit value has been decided in advance based on the results of experiments, simulations or the like.

In the following, an execution procedure of the addition processing in this embodiment will be described along FIG. 3. FIG. 3 is a flow chart which shows a processing routine executed by the ECU 10 at the time when the addition processing is carried out. This processing routine has been beforehand stored in the ROM of the ECU 10 or the like, and is repeatedly executed at a predetermined interval during the operation of the internal combustion engine 1.

Figure 3:
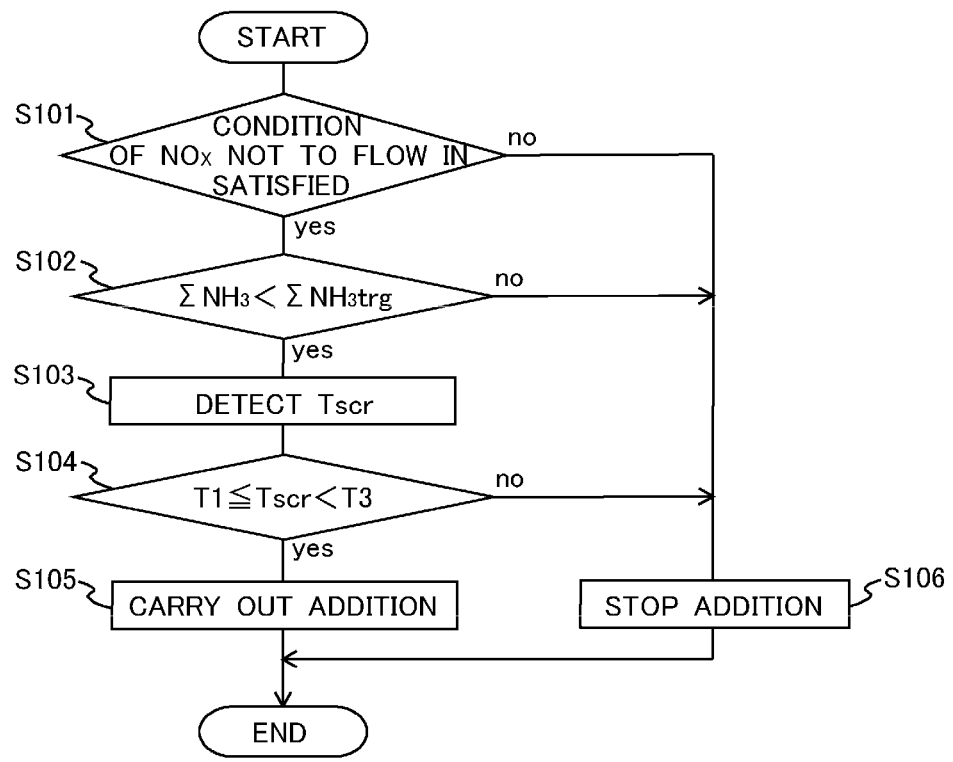
FIG. 3 is a flow chart showing a processing routine which is executed by an ECU at the time when addition processing is carried out in the first embodiment of the present disclosure.

In the processing routine of FIG. 3, first in the processing of step S101, the ECU 10 determines whether the condition under which it is assumed that $NO_X$ does not flow into the SCR catalyst is satisfied. In that case, when the storage amount of $NO_X$ in the NSR catalyst is less than the predetermined upper limit value, and when the air fuel ratio of the exhaust gas flowing into the NSR catalyst is a lean air fuel ratio, the ECU 10 makes a determination that the condition under which it is assumed that $NO_X$ does not flow into the SCR catalyst is satisfied. In addition, in cases where the air fuel ratio of the mixture used for combustion in the internal combustion engine 1 is a rich air fuel ratio, too, the ECU 10 makes a determination that the condition that $NO_X$ does not flow into the SCR catalyst is satisfied. Moreover, in cases where the fuel cut processing of the internal combustion engine 1 is being carried out, too, the ECU 10 makes a determination that the condition that $NO_X$ does not flow into the SCR catalyst is satisfied. In cases where an affirmative determination is made in the processing of step S101, the routine of the ECU 10 goes to the processing of step S106, where the addition valve 5 is controlled in order to stop the addition of the aqueous urea solution. Here, note that in cases where the addition of the aqueous urea solution has already been stopped at a point in time at which the processing of step S106 is carried out, the ECU 10 controls the addition valve 5 in order to continue an addition stop state. On the other hand, in cases where an affirmative determination is made in the processing of step S101, the routine of the ECU 10 goes to the processing of step S102.

In the processing of step S102, the ECU 10 determines whether an adsorption amount of ammonia $\Sigma NH_3$ in the SCR catalyst is smaller than a predetermined target adsorption amount $\Sigma NH_3 trg$. Here, the adsorption amount of ammonia $\Sigma NH_3$ in the SCR catalyst is obtained by integrating an amount of change (increase or decrease) $\Sigma NH_3$ of the adsorption amount of ammonia per unit time. Specifically, the adsorption amount of ammonia $\Sigma NH_3$ is calculated based on the following expression (1).

$$\Sigma NH_3 = \Sigma NH_3 old + \Sigma NH_3 \qquad (1)$$

$\Sigma NH_3 old$ in expression (1) above is the last value of the adsorption amount of ammonia.

The above-mentioned amount of change (increase or decrease) $\Sigma NH_3$ is a value which is obtained by subtracting a consumption amount of ammonia per unit time (an amount of ammonia consumed for $NO_X$ reduction per unit time in the SCR catalyst) and an amount of ammonia slip per unit time from the amount of ammonia supplied to the SCR catalyst per unit time. The amount of ammonia to be supplied to the SCR catalyst per unit time can be calculated based on the amount of the urea water solution to be added from the addition valve 5 per unit time. Here, note that when the addition of the aqueous urea solution from the addition valve 5 is in a stopped state, "0" is used as the amount of ammonia to be supplied to the SCR catalyst per unit time. In addition, the consumption amount of ammonia per unit time can be calculated based on the amount of $NO_X$ reduced per unit time in the SCR catalyst. In that case, the amount of $NO_X$ reduced per unit time in the SCR catalyst can be obtained by subtracting the amount of $NO_X$ flowing out from the SCR catalyst per unit time from the amount of $NO_X$ flowing into the SCR catalyst per unit time. The amount of $NO_X$ flowing into the SCR catalyst per unit time can be obtained by multiplying the concentration of $NO_X$ in the exhaust gas detected by the first $NO_X$ sensor 6 and the flow rate of the exhaust gas (a total amount of the amount of intake air and the amount of fuel injection). The amount of $NO_X$ flowing out from the SCR catalyst per unit time can be obtained by multiplying the concentration of $NO_X$ in the exhaust gas detected by the second $NO_X$ sensor 7 and the flow rate of the exhaust gas. Moreover, the amount of ammonia slip per unit time can be obtained by multiplying the concentration of ammonia detected by the ammonia sensor 9 and the flow rate of the exhaust gas.

Here, returning to the processing routine of FIG. 3, in cases where a negative determination is made in the processing of step S102 ($\Sigma NH_3 \geq \Sigma NH_3 trg$), the routine of the ECU 10 goes to the processing of step S106, without carrying out addition processing. On the other hand, in cases where a negative determination is made in step S102 ($\Sigma NH_3 < \Sigma TH_3 trg$), the routine of the ECU 10 goes to the processing of step S103 onward.

In the processing of step S103, the routine of the ECU 10 detects the temperature of the SCR catalyst Tscr. In that case, the ECU 10 may estimate the temperature of the SCR catalyst Tscr based on the temperature of the exhaust gas detected by the exhaust gas temperature sensor 8 and the flow rate of exhaust gas. Here, note that in cases where an exhaust gas temperature sensor in addition to the exhaust gas temperature sensor 8 is also arranged in the exhaust passage 2 at a location between the first catalyst casing 3 and the second catalyst casing 4, the ECU 10 may estimate the temperature of the SCR catalyst Tscr based on a difference between the temperatures of the exhaust gas detected by these two sensors and the flow rate of the exhaust gas.

In the processing of step S104, the ECU 10 determines whether the temperature of the SCR catalyst Tscr detected in the above-mentioned processing of step S103 falls within the above-mentioned effective temperature range. Specifically, the routine of the ECU 10 determines whether the temperature of the SCR catalyst Tscr detected in the processing of step S103 falls within the temperature range which is equal to or higher than the first temperature T1 and which is less than the third temperature T3 in FIG. 2.

In cases where a negative determination is made in the processing of step S104, it can be assumed that the amount of ammonia adsorbing to the active sites can not be increased in an efficient manner, while suppressing the adsorption of ammonia to the weak adsorption sites, and hence, the routine of the ECU 10 goes to the processing of step S106. On the other hand, in cases where an affirmative determination is made in the processing of step S104, it can be assumed that the amount of ammonia adsorbing to the active sites can be increased in an efficient manner, while suppressing the adsorption of ammonia to the weak adsorption sites, and hence, the routine of the ECU 10 goes to the processing of step S105. Then, in the processing of step S105, the ECU 10 controls the addition valve 5 in order to add the aqueous urea solution.

When the addition processing is carried out according to the procedure described above, an amount of ammonia adsorbing to the active sites can be increased, while suppressing an amount of ammonia adsorbing to the weak adsorption sites as small as possible. As a result, a decrease in the rate of $NO_X$ reduction at the time when the exhaust gas containing $NO_X$ flows into the SCR catalyst can be suppressed. In addition, in the addition processing, the addition of the aqueous urea solution by the addition valve 5 is carried out under the condition that $NO_X$ is assumed not to flow into the SCR catalyst, and hence, it becomes possible to increase the amount of ammonia adsorbing to the active sites, while suppressing the amount of ammonia slip to be small. As a result, it also becomes possible to suppress the amount of consumption of the aqueous urea solution to be small.

Here, a "controller" according to the present disclosure is achieved by carrying out the processings of steps S101-S106 in FIG. 3 by means of the ECU 10.

Modification of First Embodiment

In the above-mentioned first embodiment, as the condition or case where it is assumed that $NO_X$ does not flow into the SCR catalyst, there has been exemplified the case where a gas containing no $NO_X$ flows into the SCR catalyst during the operation of the internal combustion engine 1, but in addition to such a case, there can also be considered a case where the internal combustion engine 1 is in an operation stop state. Accordingly, in addition to the case where a gas containing no $NO_X$ flows into the SCR catalyst during the operation of the internal combustion engine 1, the addition processing may be carried out when the internal combustion engine 1 is in an operation stop state. Specifically, at a point in time at which the operation of the internal combustion engine 1 is stopped (e.g., at a point in time at which an unillustrated ignition switch is switched over from "on" to "off"), when the adsorption amount of ammonia $\Sigma NH_3$ is smaller than the predetermined target adsorption amount $\Sigma NH_3 trg$ and when the temperature of the SCR catalyst Tscr falls within the effective range, the aqueous urea solution may be add from the addition valve 5. Thus, when the addition processing is carried out immediately after the stop of the operation of the internal combustion engine 1, it becomes possible to enhance the $NO_X$ reduction rate of the SCR catalyst immediately after the internal combustion engine has been restarted.

Second Embodiment

Next, reference will be made to a second embodiment of the present disclosure based on FIGS. 4 through 6. Here, a construction of this second embodiment different from that of the above-mentioned first embodiment will be described, and an explanation of the same construction will be omitted. The difference of this second embodiment from the above-mentioned first embodiment is that when the adsorption amount of ammonia $\Sigma NH_3$ is smaller than the predetermined target adsorption amount $\Sigma NH_3 trg$ and when the condition that $NO_X$ is assumed not to flow into the SCR catalyst is satisfied, the temperature of the SCR catalyst Tscr will be forcibly raised to a temperature within the effective range by heating the SCR catalyst, if the temperature of the SCR catalyst Tscr is lower than the effective range.

Figure 4:
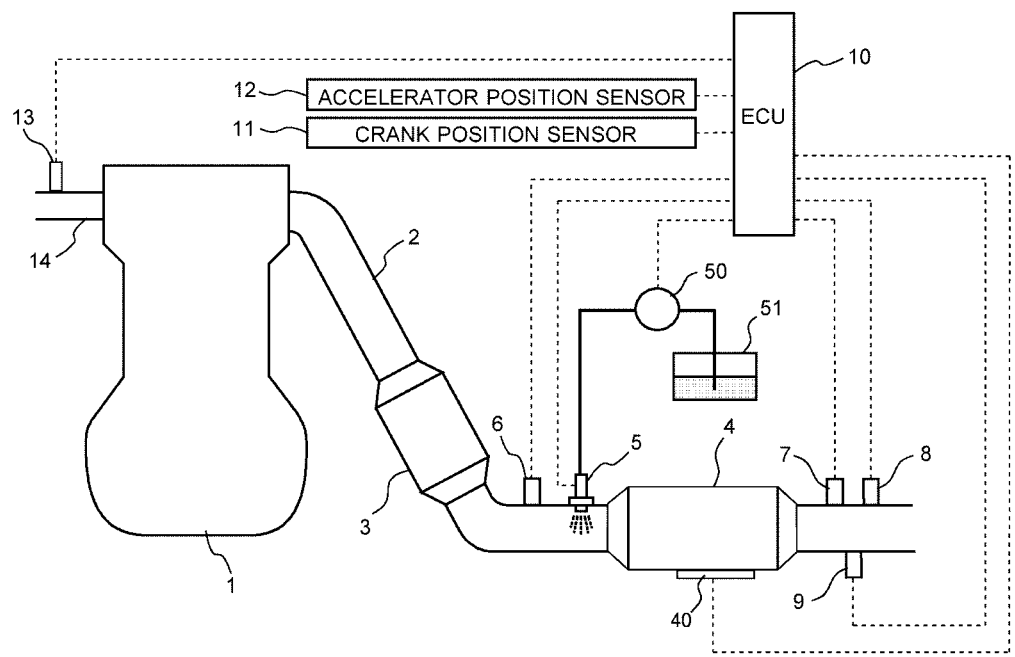
FIG. 4 is a view showing the schematic construction of an internal combustion engine and its intake and exhaust systems to which the present disclosure is applied, in a second embodiment of the present disclosure.

FIG. 4 is a view showing the schematic construction of an internal combustion engine 1 and its intake and exhaust systems according to this second embodiment of the present disclosure. In FIG. 4, the same symbols are attached to the same components as those in the above-mentioned first embodiment. In FIG. 4, a heating device 40 for heating the SCR catalyst is arranged in combination with the second catalyst casing 4. This heating device 40 is an electrically heating type heater which heats the SCR catalyst by converting electrical energy into heat energy, and which is controlled by means of the ECU 10. Here, note that the heating device 40 may also be an induction heater which heats the SCR catalyst by using the electromagnetic waves generated by electrical energization. The heating device 40 may also be achieved by forming the SCR catalyst as an electrically heated catalyst. The heating device 40 may also be a burner which heats the SCR catalyst with a flame.

Next, an execution method of the addition processing in this second embodiment will be described based on FIG. 5. FIG. 5 is a timing chart showing the changes over time of the amount of $NO_X$ flowing into the SCR catalyst (the inflow amount of $NO_X$), the adsorption amount of ammonia ($NH_3$) $\Sigma NH_3$ in the SCR catalyst, the temperature of the SCR catalyst Tscr, the operating state of the heating device 40, and the operating state of the addition valve 5, during the operation of the internal combustion engine 1.

Figure 5:
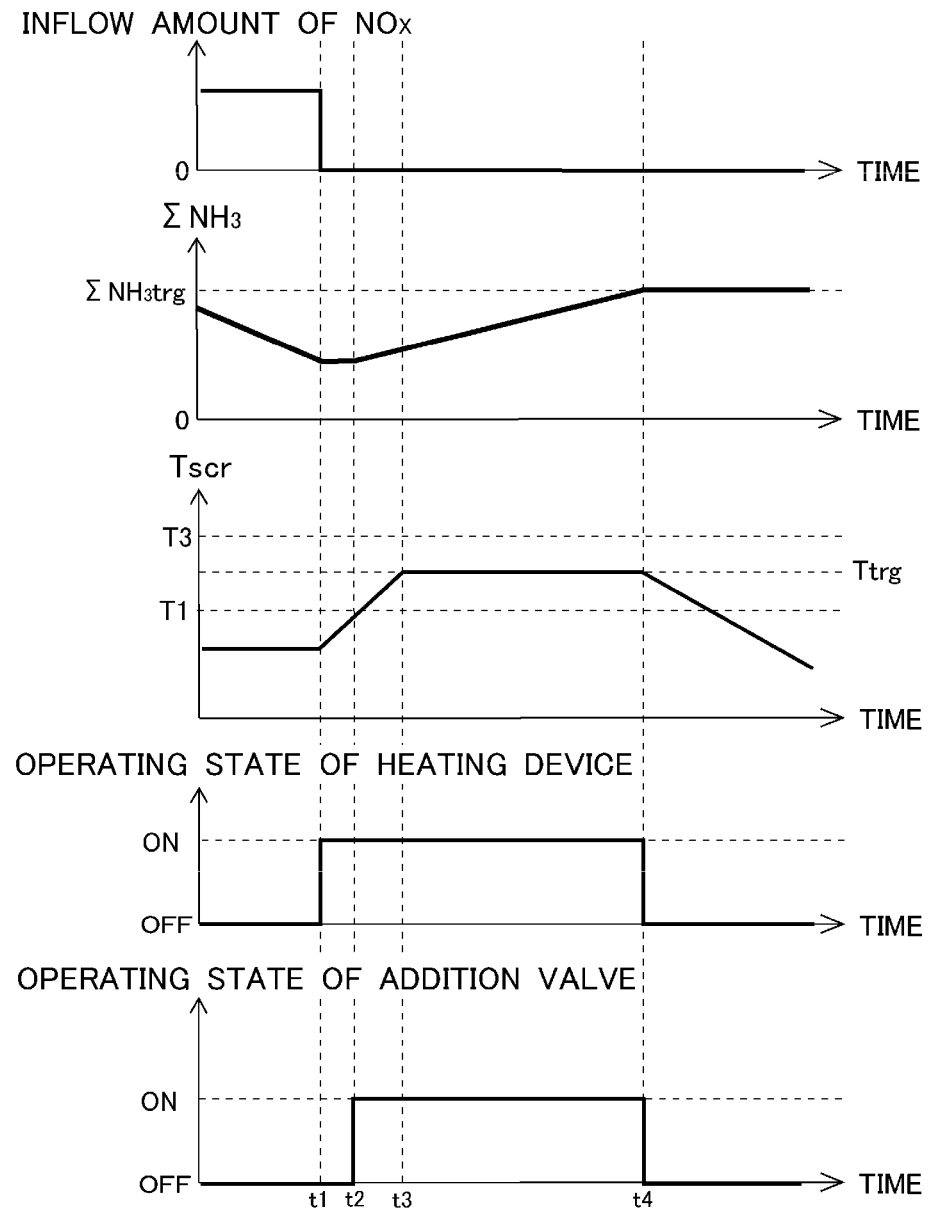
FIG. 5 is a timing chart showing the changes over time of the inflow amount of $NO_X$, the adsorption amount of ammonia ($NH_3$) $\Sigma NH_3$, the temperature of the SCR catalyst Tscr, the operating state of a heating device, and the operating state of an addition valve, during the operation of the internal combustion engine.

As shown in FIG. 5, the inflow amount of $NO_X$ becomes substantially zero when the condition that $NO_X$ is assumed not to flow into the SCR catalyst is satisfied (t1 in FIG. 5) by the achievement of one of the following conditions. That is, the storage amount of $NO_X$ in the NSR catalyst is less than the predetermined upper limit value, and at the same time, the air fuel ratio of the exhaust gas flowing into the NSR catalyst is a lean air fuel ratio; the air fuel ratio of the mixture used for combustion in the internal combustion engine 1 becomes a rich air fuel ratio; and fuel cut processing is started. In that case, when the adsorption amount of ammonia $\Sigma NH_3$ is smaller than the predetermined target adsorption amount $\Sigma NH_3 trg$ and when the temperature of the SCR catalyst Tscr is lower than a lower limit value of the effective range (the above-mentioned first temperature T1 in FIG. 2), the ECU 10 raises temperature of the SCR catalyst by first activating the heating device 40.

When the temperature of the SCR catalyst Tscr reaches the first temperature T1 (t2 in FIG. 5) by heating the SCR catalyst by means of the heating device 40, the ECU 10 starts the addition of the aqueous urea solution by switching the addition valve 5 from a valve closed state (off) to a valve open state (on). Thus, when the addition of the aqueous urea solution by the addition valve 5 is started, ammonia produced by thermal decomposition and hydrolyzation of the aqueous urea solution will be supplied to the SCR catalyst, so that the adsorption amount of ammonia in the SCR catalyst $\Sigma NH_3$ begins to increase. In addition, when the temperature of the SCR catalyst reaches the target temperature Ttrg which is equal to or higher than the first temperature T1 and which is less than the third temperature T3 (t3 in FIG. 5), the ECU 10 controls the heating device 40 in such a manner that the temperature of the SCR catalyst Tscr is maintained at the target temperature Ttrg. For example, the ECU 10 should just repeatedly carry out processing to stop the heating device 40 when the temperature of the SCR catalyst Tscr becomes equal to or higher than the target temperature Ttrg, and to re-activate the heating device 40 when the temperature of the SCR catalyst Tscr becomes less than the target temperature Ttrg. Here, note that the target temperature Ttrg referred to herein is a temperature which is set so that the adsorption of ammonia to the active sites is carried out in an effective manner, while suppressing the adsorption of ammonia to the weak adsorption sites, and is, for example, a temperature which is equal to or higher than the second temperature T2 and which is less than the third temperature T3 in FIG. 2. Then, when the adsorption amount of ammonia in the SCR catalyst $\Sigma NH_3$ increases to the predetermined target adsorption amount $\Sigma NH_3 trg$ (t4 in FIG. 5), the ECU 10 stops the heating device 40 and at the same time stops the addition of the aqueous urea solution by the addition valve 5.

Now, an execution procedure of the addition processing in this second embodiment will be described along FIG. 6. FIG. 6 is a flow chart which shows a processing routine executed by the ECU 10 at the time when the addition processing is carried out. Here, note that in FIG. 6, the same symbols are attached to the same processings as those in the above-mentioned processing routine of FIG. 3.

Figure 6:
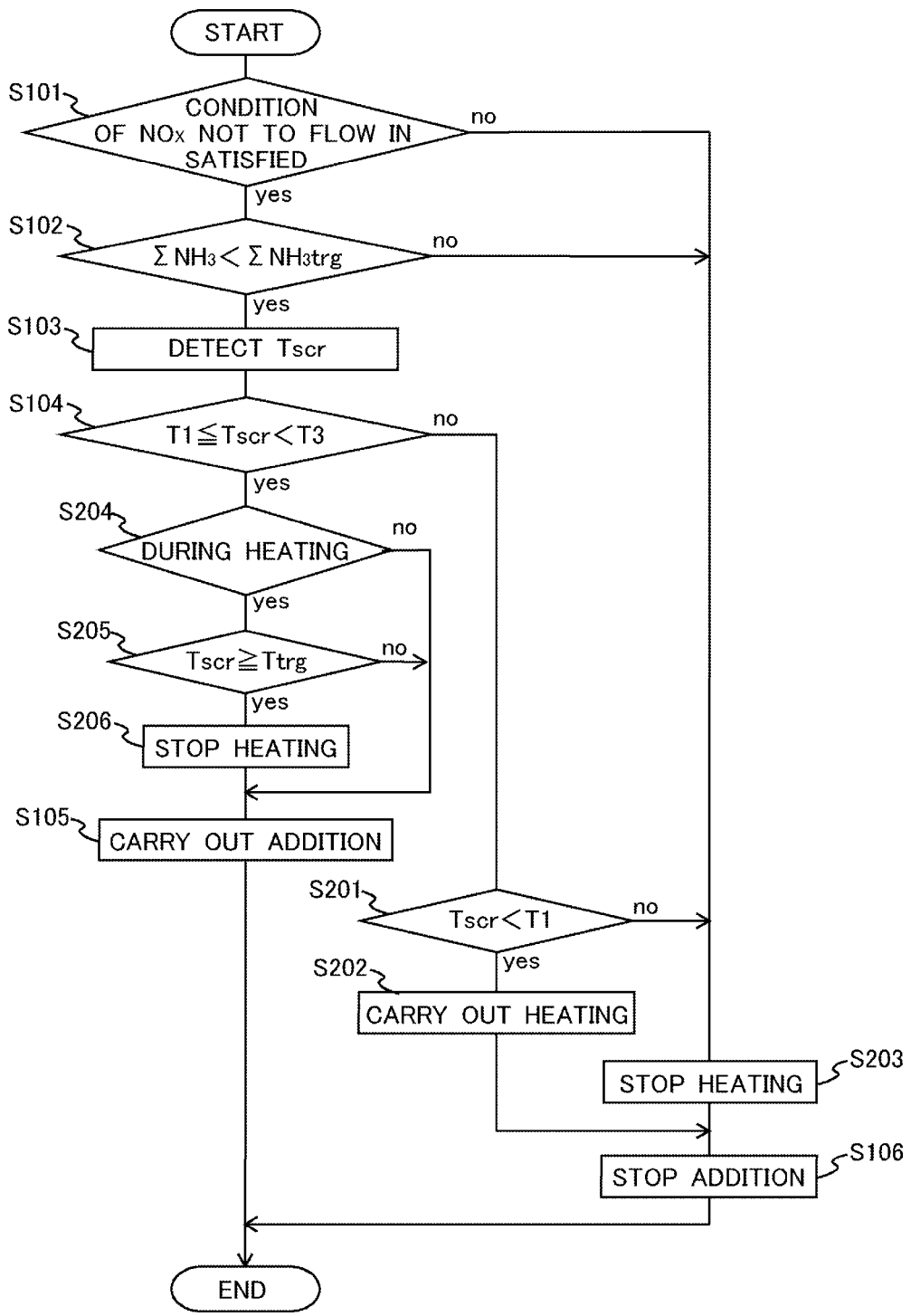
FIG. 6 is a flow chart showing a processing routine which is executed by an ECU at the time when addition processing is carried out in the second embodiment of the present disclosure.

In the control routine of FIG. 6, in cases where a negative determination is made in the processing of step S104, the routine of the ECU 10 goes to the processing of step S201. In the processing of step S201, the ECU 10 determines whether the temperature of the SCR catalyst Tscr is lower than the effective range, i.e., whether the temperature of the SCR catalyst Tscr is lower than the first temperature T1.

In cases where an affirmative determination is made in the processing of step S201 (Tscr<T1), the condition that $NO_X$ is assumed not to flow into the SCR catalyst is satisfied in a state where the adsorption amount of ammonia $\Sigma NH_3$ in the SCR catalyst is smaller than the predetermined target adsorption amount of $\Sigma NH_3 trg$, but the temperature of the SCR catalyst is lower than the effective range, so the urea water solution will not be able to be added from the addition valve 5. Accordingly, in cases where an affirmative determination is made in the processing of step S201, the routine of the ECU 10 goes to the processing of step S202, where the heating device 40 is activated in order to raise the temperature of the SCR catalyst to the target temperature Ttrg within the effective range. The routine of the ECU 10 goes to the processing of step S106, after carrying out the processing of step S202.

On the other hand, in cases where a negative determination is made in the processing of step S201, the temperature of the SCR catalyst Tscr becomes higher than the effective range (Tscr≥T3), so the ECU 10 goes to the processing of step S203, where the heating device 40 is stopped. Here, note that when the heating device 40 is already in the stop state at the time when the processing of step S203 is carried out, the ECU 10 maintains the heating device 40 in the stop state. After having carried out the processing of step S203, the routine of the ECU 10 goes to the processing of step S106. Here, note that in cases where a negative determination is made in the processing of step S101, and in cases where a negative determination is made in the processing of step S102, too, it is not necessary to activate the heating device 40 and the addition valve 5, so the ECU 10 carries out the processing of step S203 and the processing of step S106 in a sequential manner.

In addition, in cases where a positive determination is made in the processing of step S104, the ECU 10 carries out the processing of step S204. In the processing of step S204, the ECU 10 determines whether the heating device 40 is in operation (i.e., during heating). In cases where a negative determination is made in the processing of S204, the ECU 10 goes to the processing of step S105, while skipping the processings of steps S205-S206 to be described later. On the other hand, in cases where an affirmative determination is made in the processing of step S204, the ECU 10 goes to the processing of step S105, after carrying out the processings of steps S205-S206 in a sequential manner.

In the processing of step S205, the ECU 10 determines whether the temperature of the SCR catalyst Tscr detected in the processing of step S103 is equal to or higher than the above-mentioned target temperature Ttrg. In cases where an affirmative determination is made in the processing of step S205, the ECU 10 stops the heating device 40 in the processing of step S206, and subsequently in the processing of step S105, adds the aqueous urea solution from the addition valve 5. On the other hand, in cases where a negative determination is made in the processing of step S205, the routine of the ECU 10 goes to the processing of step S105, while skipping the processing of step S206. That is, in cases where a negative determination is made in the processing of step S205, the ECU 10 adds the aqueous urea solution from the addition valve 5, while maintaining the heating device 40 in operation.

According to this embodiment as described above, when the adsorption amount of ammonia $\Sigma NH_3$ in the SCR catalyst is smaller than the predetermined target adsorption amount $\Sigma NH_3 trg$, and when the condition that $NO_X$ is assumed not to flow into the SCR catalyst is satisfied, the temperature of the SCR catalyst Tscr will be forcibly raised to a temperature within the effective range by the SCR catalyst being heated by means of the heating device 40, if the temperature of the SCR catalyst Tscr is lower than the effective range. As a result, when the adsorption amount of ammonia $\Sigma NH_3$ in the SCR catalyst is smaller than the predetermined target adsorption amount $\Sigma NH_3 trg$ and when the condition that $NO_X$ is assumed not to flow into the SCR catalyst is satisfied, the state where the temperature of the SCR catalyst Tscr becomes lower than the effective range is suppressed from continuing. In other words, when the adsorption amount of ammonia $\Sigma NH_3$ in the SCR catalyst is smaller than the predetermined target amount adsorption $\Sigma NH_3 trg$ and when the condition that $NO_X$ is assumed not to flow into the SCR catalyst is satisfied, the state where the addition of the aqueous urea solution by the addition valve 5 can not be carried out is suppressed from continuing.

Accordingly, according to this second embodiment, in such a case where the state where the temperature of the exhaust gas flowing into the second catalyst casing 4 becomes lower than the effective range continues, etc., it is possible to suppress the continuation of the state where the ammonia having adsorbed to the active sites of the SCR catalyst is consumed for the reduction of $NO_X$, without ammonia being supplied to the SCR catalyst from the supply device. As a result, the amount of the ammonia having adsorbed to the active sites of the SCR catalyst is suppressed from becoming excessively small.

Here, note that a "controller" according to the present disclosure is achieved by carrying out the processings of steps S101-S106 and S201-S206 in FIG. 6 by means of the ECU 10.

Modification of Second Embodiment

In the above-mentioned second embodiment, as the condition or case where it is assumed that $NO_X$ does not flow into the SCR catalyst, there has been exemplified the case where a gas containing no $NO_X$ flows into the SCR catalyst during the operation of the internal combustion engine 1, but in addition to such a case, there can also be considered a case where the internal combustion engine 1 is in an operation stop state. Accordingly, in addition to the case where a gas containing no $NO_X$ flows into the SCR catalyst during the operation of the internal combustion engine 1, the addition processing may be carried out when the internal combustion engine 1 is in an operation stop state. Specifically, at a point in time at which the operation of the internal combustion engine 1 is stopped (e.g., at a point in time at which an unillustrated ignition switch is switched over from "on" to "off"), when the adsorption amount of ammonia $\Sigma NH_3$ is smaller than the predetermined target adsorption amount of $\Sigma NH_3 trg$ and when the temperature of the SCR catalyst Tscr is lower than the effective range, the aqueous urea solution should just be added from the addition valve 5, after the temperature of the SCR catalyst has been raised to a temperature within the effective range by means of the heating device 40. Thus, when the addition processing is carried out immediately after the stop of the operation of the internal combustion engine 1, it becomes possible to enhance the $NO_X$ reduction rate of the SCR catalyst immediately after the internal combustion engine has been restarted.

Other Embodiments

Figure 2:
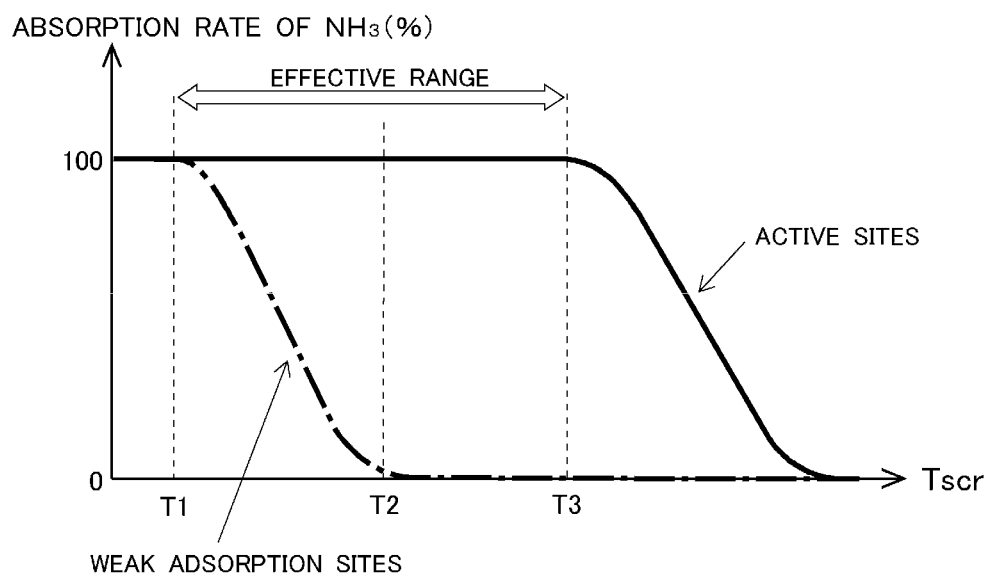
FIG. 2 is a view showing the correlation between the temperature of an SCR catalyst and the adsorption rate of ammonia ($NH_3$) at each adsorption site.

In the respective embodiments mentioned above, examples have been described in which the temperature range, which is equal to or higher than the first temperature T1 and is less than the third temperature T3, is set as the effective range, but a temperature range, which is equal to or higher than the second temperature T2 and is less than the third temperature T3 in FIG. 2, may be set as the effective range. In the temperature range which is equal to or higher than the second temperature T2 and which is less than the third temperature T3, the adsorption rate of ammonia at the weak adsorption sites becomes substantially 0%, and at the same time, the adsorption rate of ammonia at the active sites becomes substantially 100%, and hence, if such a temperature range is set as the effective range, the amount of ammonia adsorbing to the active sites can be increased, while suppressing the amount of ammonia adsorbing to the weak adsorption sites as small as possible in a more reliable manner.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-55908, filed on Mar. 22, 2017, which is hereby incorporated by reference herein in its entirety

The invention claimed is:

1. An exhaust gas purification apparatus for an internal combustion engine comprising:
a selective catalytic reduction catalyst that is arranged in an exhaust passage of the internal combustion engine, and reduces $NO_X$ in an exhaust gas by using a reducing agent;
a supply device that is arranged in the exhaust passage at the upstream side of the selective catalytic reduction catalyst, and supplies an additive agent, which is the reducing agent or a precursor of the reducing agent, to the selective catalytic reduction catalyst; and a controller comprising at least one processor, the controller configured to:
detect a temperature of the selective catalytic reduction catalyst; and
control the supply device in such a manner that an adsorption amount of the reducing agent, which is an amount of the reducing agent having been adsorbed to the selective catalytic reduction catalyst, becomes a predetermined target adsorption amount;
wherein in cases where the adsorption amount of the reducing agent in the selective catalytic reduction catalyst is smaller than the predetermined target adsorption amount, when the detected temperature of the selective catalytic reduction catalyst falls within an effective range which is a temperature range which is equal to or higher than a desorption temperature of the reducing agent adsorbed to weak adsorption sites of the selective catalytic reduction catalyst and which is less than a desorption temperature of the reducing agent adsorbed to active sites of the selective catalytic reduction catalyst, the controller controls the supply device so that the additive agent is supplied to the selective catalytic reduction catalyst.

2. The exhaust gas purification apparatus for an internal combustion engine according to claim 1,
wherein in cases where the adsorption amount of the reducing agent in the selective catalytic reduction catalyst is smaller than the predetermined target adsorption amount, when the detected temperature of the selective catalytic reduction catalyst falls within the effective range, and when a condition of $NO_X$ being assumed not to flow into the selective catalytic reduction catalyst is satisfied, the controller controls the supply device so that the additive agent is supplied to the selective catalytic reduction catalyst.

3. The exhaust gas purification apparatus for an internal combustion engine according to claim 1, further comprising:
a heating device configured to heat the selective catalytic reduction catalyst,
the controller is further configured to:
control the heating device in order to raise the temperature of the selective catalytic reduction catalyst to a temperature within the effective range, when the detected temperature of the selective catalytic reduction catalyst is lower than the effective range at the time when a condition of $NO_X$ being assumed not to flow into the selective catalytic reduction catalyst is satisfied, in cases where the adsorption amount of the reducing agent in the selective catalytic reduction catalyst is smaller than the predetermined target adsorption amount.

4. The exhaust gas purification apparatus for an internal combustion engine according to claim 2, further comprising:
a heating device configured to heat the selective catalytic reduction catalyst,
the controller is further configured to:
control the heating device in order to raise the temperature of the selective catalytic reduction catalyst to a temperature within the effective range, when the detected temperature of the selective catalytic reduction catalyst is lower than the effective range at the time when a condition of $NO_X$ being assumed not to flow into the selective catalytic reduction catalyst is satisfied, in cases where the adsorption amount of the reducing agent in the selective catalytic reduction catalyst is smaller than the predetermined target adsorption amount.

5. The exhaust gas purification apparatus for an internal combustion engine according to claim 1, further comprising:
an $NO_X$ storage reduction catalyst that is arranged in the exhaust passage at the upstream side of the selective catalytic reduction catalyst, and acts to store $NO_X$ in the exhaust gas when the air fuel ratio of the exhaust gas is a lean air fuel ratio higher than a stoichiometric air fuel ratio, but to release and reduce the $NO_X$ thus stored when the fuel ratio of the exhaust gas is a rich air fuel ratio lower than the stoichiometric air fuel ratio;
wherein the controller makes a determination that a condition of $NO_X$ being assumed not to flow into the selective catalytic reduction catalyst is satisfied, when the air fuel ratio of the exhaust gas flowing into the $NO_X$ storage reduction catalyst is a lean air fuel ratio, and when the storage amount of $NO_X$ in the $NO_X$ storage reduction catalyst is equal to or less than a predetermined upper limit value, during operation of the internal combustion engine.

6. The exhaust gas purification apparatus for an internal combustion engine according to claim 2, further comprising:
an $NO_X$ storage reduction catalyst that is arranged in the exhaust passage at the upstream side of the selective catalytic reduction catalyst, and acts to store $NO_X$ in the exhaust gas when the air fuel ratio of the exhaust gas is a lean air fuel ratio higher than a stoichiometric air fuel ratio, but to release and reduce the $NO_X$ thus stored when the fuel ratio of the exhaust gas is a rich air fuel ratio lower than the stoichiometric air fuel ratio;
wherein the controller makes a determination that a condition of $NO_X$ being assumed not to flow into the selective catalytic reduction catalyst is satisfied, when the air fuel ratio of the exhaust gas flowing into the $NO_X$ storage reduction catalyst is a lean air fuel ratio, and when the storage amount of $NO_X$ in the $NO_X$ storage reduction catalyst is equal to or less than a predetermined upper limit value, during operation of the internal combustion engine.

7. The exhaust gas purification apparatus for an internal combustion engine according to claim 3, further comprising:
an $NO_X$ storage reduction catalyst that is arranged in the exhaust passage at the upstream side of the selective catalytic reduction catalyst, and acts to store $NO_X$ in the exhaust gas when the air fuel ratio of the exhaust gas is a lean air fuel ratio higher than a stoichiometric air fuel ratio, but to release and reduce the $NO_X$ thus stored when the fuel ratio of the exhaust gas is a rich air fuel ratio lower than the stoichiometric air fuel ratio;
wherein the controller makes a determination that a condition of $NO_X$ being assumed not to flow into the selective catalytic reduction catalyst is satisfied, when the air fuel ratio of the exhaust gas flowing into the $NO_X$ storage reduction catalyst is a lean air fuel ratio, and when the storage amount of $NO_X$ in the $NO_X$ storage reduction catalyst is equal to or less than a predetermined upper limit value, during operation of the internal combustion engine.

8. The exhaust gas purification apparatus for an internal combustion engine according to claim 4, further comprising:
an $NO_X$ storage reduction catalyst that is arranged in the exhaust passage at the upstream side of the selective catalytic reduction catalyst, and acts to store $NO_X$ in the exhaust gas when the air fuel ratio of the exhaust gas is a lean air fuel ratio higher than a stoichiometric air fuel ratio, but to release and reduce the $NO_X$ thus stored when the fuel ratio of the exhaust gas is a rich air fuel ratio lower than the stoichiometric air fuel ratio;
wherein the controller makes a determination that a condition of $NO_X$ being assumed not to flow into the selective catalytic reduction catalyst is satisfied, when the air fuel ratio of the exhaust gas flowing into the $NO_X$ storage reduction catalyst is a lean air fuel ratio, and when the storage amount of $NO_X$ in the $NO_X$ storage reduction catalyst is equal to or less than a predetermined upper limit value, during operation of the internal combustion engine.

9. The exhaust gas purification apparatus for an internal combustion engine according to claim 1, wherein the controller makes a determination that a condition of $NO_X$ being assumed not to flow into the selective catalytic reduction catalyst is satisfied, when an air fuel ratio of a mixture used for combustion in the internal combustion engine is a rich air fuel ratio.

10. The exhaust gas purification apparatus for an internal combustion engine according to claim 1,
    wherein the controller makes a determination that a condition of $NO_X$ being assumed not to flow into the selective catalytic reduction catalyst is satisfied, when fuel cut processing of the internal combustion engine is in an execution state.

11. The exhaust gas purification apparatus for an internal combustion engine according to claim 1,
    wherein the controller makes a determination that a condition of $NO_X$ being assumed not to flow into the selective catalytic reduction catalyst is satisfied, when the internal combustion engine is in an operation stop state.

* * * * *